Patented Jan. 1, 1924.

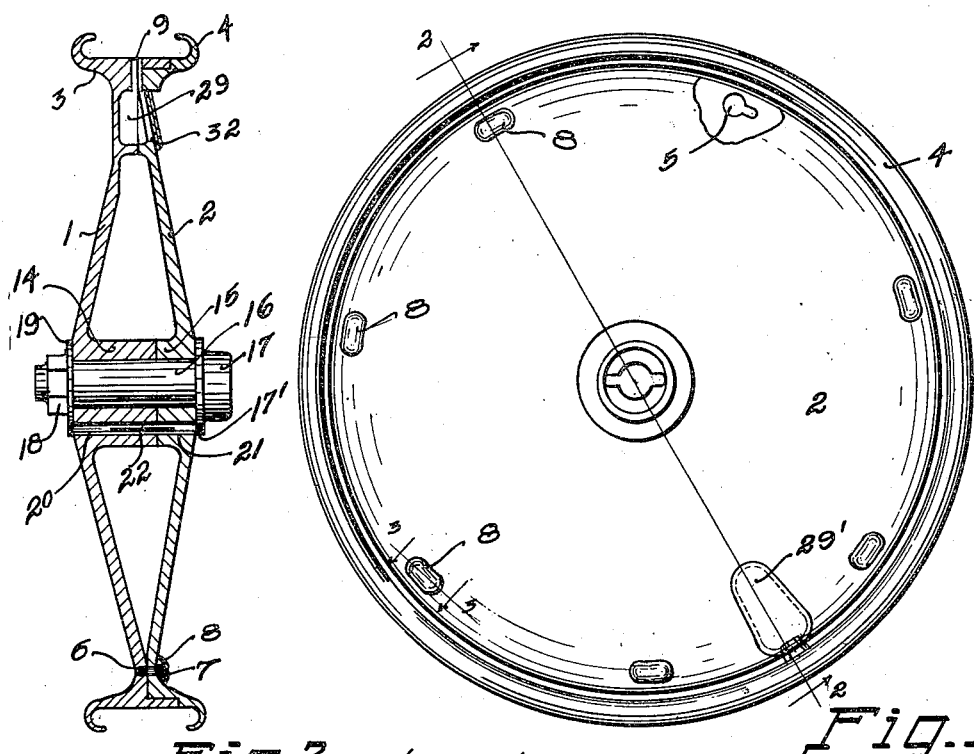

1,479,417

UNITED STATES PATENT OFFICE.

WILLIAM C. LEONARD, OF LEWISTON, IDAHO, ASSIGNOR TO LEONARD ROLLER GEAR DRIVE THRESHER COMPANY, OF LEWISTON, IDAHO.

DISK WHEEL.

Application filed September 23, 1922. Serial No. 590,014.

*To all whom it may concern:*

Be it known that I, WILLIAM C. LEONARD, a citizen of the United States, residing at Lewiston, in Nez Perce County and State of Idaho, have invented certain new and useful Improvements in Disk Wheels, of which the following is a specification.

My present invention relates to improvements in disk wheels adapted principally for use with automotive vehicles. The primary object of the invention is the provision of a wheel of this type which shall be comparatively light in weight but insure a strong and durable structure. By the combination and arrangement of parts of the wheel, the necessary resiliency is secured for absorbing vibrations in the wheel due to irregularities in the road over which the wheel is passing, thus eliminating possibilities of breakage due to shocks. And a well braced structure of the required rigidity is maintained for supporting the load carried on the wheels.

With these ends in view the invention consists in certain novel combinations and arrangements of parts as hereinafter described and claimed.

In the accompanying drawings I have illustrated one complete example of the physical embodiment of my invention in which the parts are combined and arranged according to the best mode I have thus far devised for the practical application of the principals of my invention.

Figure 1 is a view in side elevation of a wheel constructed according to my invention, looking at the inner side of the wheel, with a part of one of the plates or disks broken away for convenience of illustration.

Figure 2 is a vertical, central sectional view of the wheel, on a line indicated at 2—2 of Figure 1.

Figure 3 is an enlarged, detail, sectional view at line 3—3 of Figure 1 showing the manner of locking the two complementary disks together.

Figure 4 is a plan view at a portion of the outer face or rim of the wheel, showing a filler block used in connection with the valve stem.

Figure 5 is a detail perspective view showing the filler block carried by one of the wheel sections or disks.

Figure 6 is a face view of the hub cap.

Figure 7 is a view partly in section of the locking pin used in connection with the hub sections of the wheel.

Figure 8 is a perspective view of a cover plate by means of which access may be had to the pocket for the valve stem, when a pneumatic tire is used on the wheel.

In the form of the invention as illustrated in the drawings either a solid tire or a pneumatic tire may be used and retained on the wheel by the clincher method, and the wheel as shown includes a pair of complementary circular disks or plates 1 and 2 stamped or otherwise fashioned to the required form and shape.

The circular disks are of concavo-convex form, or cambered, their walls being spaced apart at the hub portion of the wheel and converging at or near the periphery of the wheel, where the respective disks are fashioned with annularly flanged rim sections 3 and 4. A solid tire of suitable form may be clamped between these rim sections, or a pneumatic tire may be retained between the rim sections. At their points of convergence the two disks are locked together against relative lateral or side-wise movement by the co-action of the key-hole slots 5 in the disk 2 and the complementary pins 6 fixed in the disk 1, said pins having heads 7 to retain the disks in locked position. In locking the disks or sections together, after the several slots of disk 2 have been slipped over the headed pins, the disk 2 is rotated with relation to the disk 1, as indicated in dotted lines Figure 3, to lock the parts in usual manner. And the parts are unlocked by a reverse movement, when it is desired to separate the disks. A suitable number of these slot and pin connections are utilized, spaced at regular intervals about the wheel within the rim section, and the disk 2 may be fashioned with an offset wall 8 over its slotted portions to form an enclosing pocket for the exclusion of dust and moisture from the locked joints.

When a pneumatic tire is used with the wheel, the valve stem of the inner tube is accommodated in the radially extending opening 9 in the rim section 3, and a laterally extending slot 10, opening at the edge of this rim section permits the edge of the rim section to be pushed around the valve stem when the former is being positioned for use. To close this slot, after the rim section is in place, or while it is being moved into place, I provide a filler block 11 slidable on and carried by the rim section 4 of the disk 2. The filler block is of a complementary size and shape to fit neatly in the slot 10 and close the slot leaving the opening about the valve stem, as at 9. The filler block is located in horizontal position, and is connected with the rim section 4 through the instrumentality of an end pin 12 projecting from the block and retained in a circumferentially extending, short slot 13 in the inner wall of the rim section 2, as seen in Figure 5. Thus, after the two disks have been assembled with the filler block in its slot, the disks are relatively rotated for locking by the co-action of the keyhole slots 5 and headed pins 6, and the filler block slides with its pin in the groove 13, holding the block in proper position in its slot.

The two disks are provided with hub sleeves 14 and 15 closely abutting when the disks are assembled in position, and when these hub sleeves are rigidly connected the converging walls of the disks are placed under a tension which insures sufficient resiliency to absorb shocks from vibrations and adequate strength to support the load on the wheel. The hub-sleeves are joined by means of a hollow bolt 16 passing through the hub from the inside of the wheel, and a bolt head 17 is provided with a circular flange 17′ to engage against the face of the hub sleeve 15.

At the outer side of the wheel a hub-cap 18 is threaded on the bolt 16, with its perforated flange 19 bearing against the outer face of the hub sleeve 14 of the disk 1, and by means of the threaded hub-cap and headed hollow bolt 16, the hub sleeves are rigidly clamped together.

To prevent relative rotary movement of the disks they are locked together at the hub portion, and for this purpose a pair of alined, horizontally extending openings 20 and 21 are provided in the respective hub sleeves 14 and 15, which are adapted to receive a pin 22 for locking them against relative movement. At its outer end the pin is pointed as at 23 to engage one of the perforations or notches or indentations 19′ of the flange 19, and at its inner end the spring is provided with a spring 24, bearing against the flange 17′ of the bolt head 17. The spring is retained in the end socket 25 of the pin, and urges the pin toward the hub cap to retain its point in one of the indentations 19′. To prevent turning of the pin in its opening a friction or leaf spring 26 is located in an exterior, longitudinally extending groove 27 of the pin, and the friction spring also prevents accidental displacement of the pin from its socket when the hub cap is removed, as for changing tires. To facilitate removal of the pin, it may be provided with a notch 28 in its exterior in which a tool may be inserted to pry the pin from its socket after the hub cap is removed. By its engagement with the indented flange of the hub cap, it will be apparent that the pin performs the function of a nut lock, to prevent displacement or turning of the hub cap. But the hub cap may be turned by the application thereto of a wrench or other suitable tool, the spring pressed pin permitting this turning movement when sufficient power is applied to the wrench or tool.

For covering the valve-stem pocket 29 to protect the valve stem, I utilize a shield or cover plate 29′ of metal, which is fashioned with lugs 30 30 at one end to engage the walls of the pocket 29, and at the opposite end is provided with a hook 31, preferably resilient so that it may be snapped into contact with the outer face of the disk 2 which may be slotted for the purpose at 32.

If desired a flap or flexible cover may be utilized in connection with the slot 10 at the valve stem opening, but such flexible cover is not essential, as the filler block provides a smooth continuous surface for the rim against which the inner tube of the pneumatic tire may contact without danger or wear or tearing.

The wheel as thus constructed is comparatively light, but strong and durable, possesses the required resiliency for absorbing vibrations, may be assembled or taken apart with facility and convenience, is waterproof and dust-proof, and provides a neat and workmanlike appearance.

Having thus fully described my invention, what I claim as new and desire to secure by Letters Patent is—

1. The combination in a wheel as described comprising a pair of complementary, cambered disks with means for locking their converging walls near the periphery of the wheel, of complementary inner hub sleeves on said disks, a flanged, hollow bolt passed through said sleeves, a hub cap on the end of the bolt for clamping the sleeves together, and means for locking said sleeves against relative rotary movement.

2. The combination in a disk wheel comprising concavo-convex disks of resilient metal and means for locking said disks near their peripheries, of complementary, inner hub sleeves on said disks, a bolt having a head and a hub cap for clamping said sleeves, said sleeves having alined openings and a spring pressed locking pin in said openings engaging said head and hub cap.

3. The combination in a sectional disk wheel having complementary hub sleeves, of a hollow bolt having a head and flange, a hub cap on the bolt, said sleeves having alined openings, and a spring pressed pin in said openings engaging said head and hub cap.

4. The combination in a sectional disk wheel having complementary hub sleeves, of a hollow bolt having a head and flange, a hub cap on the bolt having a flange and indentations therein, said sleeves having alined openings and a spring pressed locking pin in said alined openings engaging said bolt flange and the hub cap flange as described.

5. The combination in a sectional disk wheel comprising concavo-convex disks having co-acting keyhole slots and headed pins for locking said disks against lateral movement, of an offset hood on one of said disks for said slots and pins forming an enclosing pocket therefor.

6. The combination in a sectional wheel comprising complementary disks each having annular rim sections to form a tire channel, one of said rim sections having a radially extending aperture for a valve-stem and a horizontally extending slot, and a filler block carried by the other rim section adapted to close said slot.

7. The combination in a sectional wheel comprising complementary disks having annular rim sections and means whereby said disks are relatively rotated to locked position, one of said rim sections having a radially extending aperture and a horizontally extending slot, a filler block on the other rim section to close said slot, and a slidable connection between said filler block and its rim section.

In testimony whereof I affix my signature.

WILLIAM C. LEONARD.